United States Patent
Eklund et al.

(10) Patent No.: US 8,279,414 B2
(45) Date of Patent: Oct. 2, 2012

(54) MONITORING DEVICE

(75) Inventors: Börje Eklund, Solna (SE); Hans Undin, Österskär (SE); Örjan Altebro, Sollentuna (SE)

(73) Assignee: Avalon Innovation AB, Stockholm (SE)

( * ) Notice: Subject to any disclaimer, the term of this patent is extended or adjusted under 35 U.S.C. 154(b) by 947 days.

(21) Appl. No.: 11/659,050

(22) PCT Filed: Jul. 12, 2005

(86) PCT No.: PCT/SE2005/001148
§ 371 (c)(1),
(2), (4) Date: Apr. 21, 2009

(87) PCT Pub. No.: WO2006/011840

PCT Pub. Date: Feb. 2, 2006

(65) Prior Publication Data
US 2009/0201489 A1 Aug. 13, 2009

(30) Foreign Application Priority Data
Jul. 30, 2004 (SE) ...................................... 0401957

(51) Int. Cl.
*G01C 3/08* (2006.01)
(52) U.S. Cl. ...... 356/5.01; 356/3.01; 356/3.1; 356/4.01; 356/5.1
(58) Field of Classification Search ......... 356/3.01–28.5
See application file for complete search history.

(56) References Cited

U.S. PATENT DOCUMENTS

| | | | |
|---|---|---|---|
| 4,949,074 A | 8/1990 | D'Ambrosia et al. | |
| 4,952,911 A | 8/1990 | D'Ambrosia et al. | |
| 5,367,458 A * | 11/1994 | Roberts et al. | 701/25 |
| 5,500,525 A | 3/1996 | Saban | |
| 5,787,369 A | 7/1998 | Knaak | |
| 5,835,203 A | 11/1998 | Ogura et al. | |
| 6,307,622 B1 * | 10/2001 | Lewis | 356/4.01 |
| 2003/0036881 A1 | 2/2003 | Remillard et al. | |
| 2004/0066500 A1 * | 4/2004 | Gokturk et al. | 356/4.01 |

FOREIGN PATENT DOCUMENTS

| | | |
|---|---|---|
| DE | 10104157 | 5/2002 |
| EP | 1 376 154 A1 | 1/2004 |
| JP | 2000-127972 | 5/2000 |
| WO | WO 93/15416 | 8/1993 |
| WO | WO 01/53851 A1 | 7/2001 |

* cited by examiner

*Primary Examiner* — Luke Ratcliffe
(74) *Attorney, Agent, or Firm* — Michaud-Kinney Group LLP

(57) ABSTRACT

The invention refers to a device and a method for monitoring a delimited area in order to detect if an undesired object is present within the area. The invention also refers to a use of the device. A first laser is adapted to emit a laser pulse (B) of a determined wavelength over the area. A first photo sensor is arranged to receive a reflected part of the laser pulse (B). An evaluation unit is connected to the laser and the photo sensor. The evaluation unit is arranged to measure the reflected part of the laser pulse (B) during a predetermined time period after the laser pulse has been emitted from the laser, to generate a signal depending on the measured reflected part and to process the generated signal in order to determine if an undesired object is present within the area.

26 Claims, 4 Drawing Sheets

MONITORING DEVICE

FIELD OF THE INVENTION

The present invention refers generally to a device adapted for monitoring an area for detecting an undesired object within the area. With object it is referred to in this application all imaginable physical objects such as stones, bags, litter, various kinds of vehicles etc. and also persons, for instance intruders, and animals.

More specifically, the invention refers to a device adapted for monitoring an area in order to detect if an undesired object is present within the area, wherein the device includes at least a first laser, which is adapted to emit a laser pulse of a determined wavelength over the area, at least a first photo sensor, which is arranged to receive a reflected part of the laser pulse, and an evaluation unit, which is connected to the laser and the photo sensor.

The invention also refers to a use of such a device, and a method for monitoring an area in order to detect if an undesired object is present within an area.

BACKGROUND OF THE INVENTION

At underground stations it is today a problem that different objects or persons may be present on the track and cause accidents when an underground train arrives at the station. The underground station is frequently short in relation to the speed of the train. Furthermore, the driver of the train normally has no possibility to see what happens at the platform, i.e. beside the track proper. Consequently, the driver has no real possibility to brake the train in good time if any object moves from the platform out on the track when the train arrives at the station. At railway stations and railway crossings, there are similar problems with persons or objects, for instance vehicles, which can be present on the track when a train arrives. Also in other areas such as airports, ports, parking places and the like there are similar problems with undesired objects or persons, for instance intruders.

Many of the areas mentioned above are too difficult to monitor due to the fact that the area lacks a physical limitation. Automatic system frequently can not delimit the monitoring to a selectable, determined area, but objects and persons moving outside the area to be monitored will disturb the signal obtained DE-10104157 discloses a monitoring arrangement including a relatively large number of vertical laser devices for monitoring a respective door of an underground train, and a relatively large number of horizontal laser devices for monitoring the track. The horizontal laser devices are arranged after each other beneath the platform along the track at an underground station. Furthermore, each of the horizontal laser devices is intended to sense a respective limited field or area of the track for identifying possible objects on the track. The laser devices are connected to a computer for evaluating the sensed fields. The arrangement disclosed has the disadvantage that it is complex and expensive to install at least partly due to the large number of laser devices to be mounted and connected.

JP 2000-127972 discloses the possibility of providing a photographic member or a laser for monitoring a platform and a track area. In this case, physical markings have been arranged at the platform for facilitating the reading of the reflected light.

U.S. Pat. No. 5,787,369 discloses a further system for monitoring a track area at a railway or a railway crossing. The system includes a laser arranged to scan an area.

WO93/154160 discloses a device for monitoring railway crossings, i.e. a relatively small area.

WO01/53851 discloses a radar monitoring device for detecting objects at a track area. The known device may be applied to an underground system U.S. Pat. No. 5,500,525 discloses a system for watching a predetermined, limited area by means of a laser beam. The known system includes an algorithm based on a comparison of an actual reflected image and a stored reference image. The system also includes an identification of an object that has been detected within the area.

U.S. Pat. No. 4,952,911 refers to an intruder watching system for watching an area. The system includes a laser device including an IR-laser diode operating at an effect of 30 mW and at a wavelength spectrum with a peak at 830 nm. The system also includes means for determining the distance to the point from which the laser beam is reflected by means on triangulation. U.S. Pat. No. 4,949,074 discloses a similar intruder watching system.

US2003/0036881 discloses a method and a system for detecting an object. The device uses a light source in the form of a laser operating within a wavelength range between 700-1500 mm. The device disclosed is intended to detect a thin area straight ahead and includes no means for scanning the beam over a larger area. Nothing is said about the possibility of using the device for monitoring a rail area or for instance an airport.

SUMMARY OF THE INVENTION

The object of the present invention is to provide a simple, efficient and secure monitoring of an area, especially a selectable, limited area. A further object is such a device which can be installed in a cost efficient manner.

This object is achieved by the device initially defined, which is characterized in that the evaluation unit is arranged to measure the reflected part of the laser pulse during an adjustable time period after the pulse has been emitted from the laser, to generate a signal depending on the measured reflected part and to process the generated signal in order to determine if an un undesired object is present within the area. The reflected part of the laser light has a certain energy and can be regarded as an energy profile. The basis for an energy profile is the possibility of combining the information about how an area is subjected to laser light (actual position of the laser) and the energy (light intensity) reflected by the surroundings. An energy profile consists of a collection of such values. Typically, such a collection describes the result of a cycle in a repeating position change of the laser. By storing the energy profile from such a cycle and use it as a reference for the following cycles, it is possible for each stored position to detect all changes which influences the reflection of the laser light for that position.

By measuring the reflected part during an adjustable time period, the size and the geographic position of the area can be determined and selected. The start and the end of the time period are adjustable, and determine the distance from the photo sensor to the forward and rearward limitation of the area. Consequently, by means of the inventive device an arbitrary area can be monitored without the provision of physical delimiting members. According to the invention a pulsed laser and in time selective measurement of the reflected light (the energy) are thus used. The selective measurement is made in such a way that merely the light (the energy) which is received during the times corresponding to reflections in the actual, interesting area to be monitored is considered in the measurement. If for instance merely an area of 0-100 m is to be monitored, only the reflections registered within about 2 µs is considered in the measurement, or if an area between 100-200 m is to be monitored, only reflections received between about 2-4 µs is considered. Since it is possible to use several different time intervals for the same pulse responds and different time intervals for different positions it is possible to practically define arbitrary areas to be monitored.

According to an embodiment of the invention, the evaluation unit is arranged to initiate said measuring an adjustable first time after the laser pulse has been emitted and to terminate said measuring an adjustable second time after the laser pulse has been emitted, wherein said time period corresponds to the difference to the second time and the first time.

According a further embodiment of the invention, said laser is adapted to emit a laser beam formed by successive laser pulses, a so called pulse train.

According to a further embodiment of the present invention, the device is arranged to scan laser pulses over the area in such a way that substantially the whole area is subjected to laser pulses during one scan. Such a scanning may be obtained by rotating said laser and photo sensor with a reciprocating movement or by means of optics. Advantageously, the device may operate with such a scanning speed that said scan lasts during a time shorter than 3 s, preferably shorter time than 2 s and more preferably shorter time than 1 s. Furthermore, the device may be arranged to scan the laser beam over the area with a reciprocating movement in such a way that the scanned area has a sector-like shape with two limiting end lines forming an angle between each other. The scanning can be performed in an arbitrary plane, for instance a horizontal plane or a vertical plane. The scanning may however also be performed both horizontally and vertically for scanning and monitoring an area in the space.

According to a further embodiment of the invention, said laser is arranged to emit laser light with a wavelength which is longer than or equal to 1200 nm. With such a wavelength it is possible to provide a monitoring of a relatively large delimited area, for instance the whole track area in the proximity of an underground station by means of one single laser. The relatively long wavelength is less harmful to the human eye than a laser, which operates with a significantly shorter wavelength. Thanks to the now proposed wavelength, a laser beam having a significantly higher effect may thus be used and in such a way such a range may be achieved that the whole track area at an underground station may be monitored by one single laser. Preferably, the wavelength is longer than or equal to 1300 nm. More preferably, the wavelength is longer than or equal to 1400 nm and especially longer than or equal to 1500 nm. According to a specific embodiment, the wavelength is about 1535 nm.

According to a further embodiment of the invention, the device includes an angle sensor sensing an angle between an instantaneous laser pulse and one of the end lines. By means of such an angle sensor, it is possible to determine the angle position of a possible object within the area.

According to a further embodiment of the present invention, the evaluation unit is arranged to compare the generated signal with a reference signal and to establish that an object is present within the area if the generated signal deviates from the reference signal with a minimum predetermined value. The evaluation unit is thus arranged to process a signal generated by the reflected beam in order to determine if there is any undesired object within the area by comparing the generated signal with a reference signal. A state where an undesired object is present within the area may thus be established if the generated signal deviates from the reference signal in any way. Especially, the reference signal can be an energy profile, i.e. a curve corresponding to one scan over the area, wherein the generated signal which also can be an energy profile, i.e. a curve corresponding to a new or the latest scan over the area. Said comparison may advantageously include a subtraction of the two curves from each other. Such a comparison between two signals can be performed in a very quick manner and with a relatively small computer power. If a normal state prevails, i.e. no undesired object is present within the area, the curves are substantially equal, wherein a straight line can be obtained on a screen. If a particular state arises, i.e. an undesired object has arrived at the area, the curve of the generated signal will deviate from the curve of the reference signal and a clear deviation appears at said line on the screen. This deviation may easily be read manually or in an automatic manor.

According to a further embodiment of the invention, the evaluation unit is arranged to register, by means of said angle sensor, a first angle as soon as the generated signal exhibits said deviation and a second angle as soon as the generated signal no longer exhibits said deviation. The evaluation unit may then be arranged to estimate the size of an undesired object by means of the difference between said angles.

According to a further embodiment of the present invention, the device includes a memory unit arranged to store the generated signal. Furthermore, the reference signal may be stored in a memory unit. Advantageously, the evaluation unit is arranged to update the reference signal by means of the generated signal. Thus, a new reference signal, which is stored in the memory unit, may be created at each new scan if the latest generated signal substantially, but not necessarily completely, corresponds to the curve of the reference signal. In such a way, the device may in a comfortable manner be self adapted to changed light conditions, slow permitted changed within the area etc.

According to a further embodiment of the present invention, the evaluation unit is arranged to generate a warning signal if it establishes that an object is present within the area. Consequently, the deviation between the signals compared to each other may initiate a warning device or, for instance, connecting of a monitoring camera where the deviation arises, i.e. at the position where the undesired object is present.

According to a further embodiment of the invention, the evaluation unit includes a time measuring unit arranged to register a first point of time when a laser pulse is emitted and a second point of time when the reflected part is received. The evaluation unit may then be arranged to calculate the distance to an undesired object by means of the difference between the second point of time and the first point of time. Furthermore, the evaluation unit may be arranged to calculate the size of an undesired object by means of the difference between said angles and by means of the difference between the second point of time and the first point of time. According to this embodiment, it is thus possible to ignore objects that are smaller than those to be detected. If the device is intended for detecting people it is advantageous if it does not give response to small birds. By means of the distance information mentioned above and by calculating how many pulses that did hit the object and the angle value for each pulse, the size of the object may thus be determined.

According to a further embodiment of the invention, the device includes at least a second laser, which is connected to the evaluation unit and adapted to emit a laser pulse of a determined wavelength over the area, and at least a second photo sensor, which is connected to the evaluation unit and arranged to receive a reflected part of the laser pulse, wherein the evaluation unit is arranged to measure the reflected part of the laser pulse during an adjustable time period after the laser pulse has been emitted from the second laser, to generate a second signal depending on the measured reflected part and to process the generated signal in order to determine if an undesired object is present within the area. The first laser and the first photo sensor may then be regarded as a first system located at a determined distance from a second system formed by the second laser and the second photo sensor. The evaluation unit may be arranged to estimate the size of an undesired object by comparing the first signal from the first system with the second signal from the second system. With two or several such systems it is also possible to ignore a small object. If a small object is so close to one of the systems that the object is being judged to be valid for detection, the second system, or second systems, has to appreciate the object as small. In the same way, a sufficiently large object is to be regarded as large of both or all systems.

The object is also achieved by the initially defined use of a device as set forth above for monitoring said area. Advantageously, the area may include an area at a railroad, an airport or a ship port.

The object is also achieved by means of the initially defined method, which includes the steps of: emitting a laser pulse of a determined wavelength over the area, receiving a reflected part of the laser pulse, measuring the reflected part of the laser pulse during an adjustable time after the laser pulse has been emitted, generating a signal depending on the measured reflected part, and processing the generated signal in order to determine if an undesired object is present within the area. The wavelength may advantageously be longer than or equal to 1200 nm.

BRIEF DESCRIPTION OF THE DRAWINGS

The present invention is now to be explained more closely by means of a description of various embodiments and with reference to the drawings attached hereto.

DETAILED DESCRIPTION OF VARIOUS EMBODIMENTS OF THE INVENTION

Figure 1:
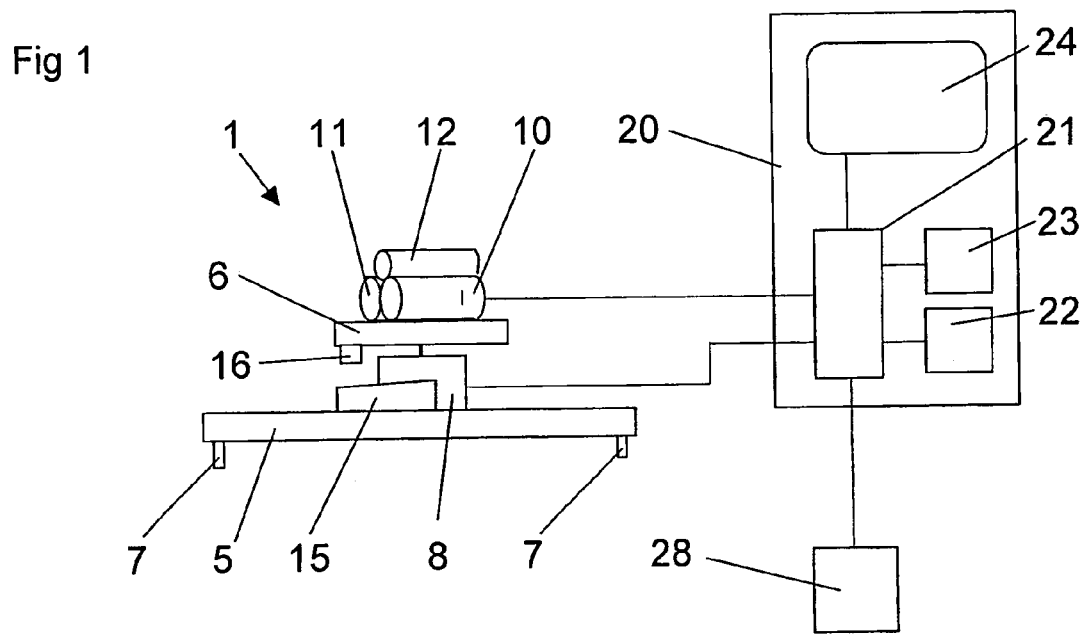
FIG. 1 discloses schematically a side view of a device according to the invention.
Figure 2:
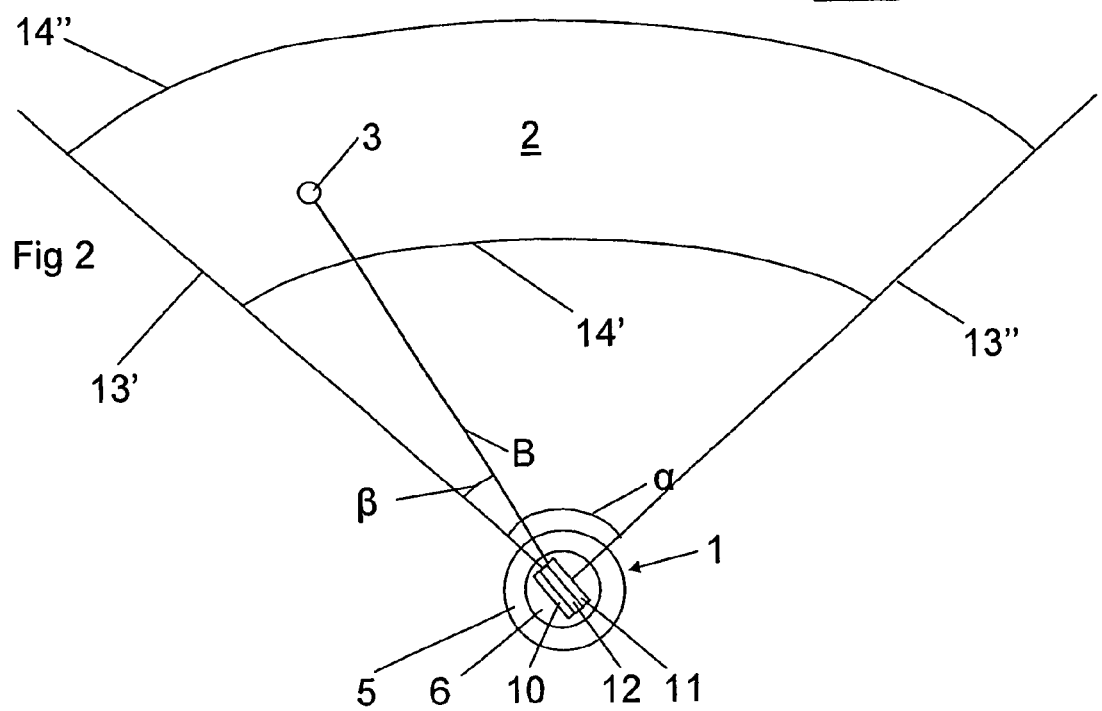
FIG. 2 discloses schematically a view from above of the device in FIG. 1.

FIGS. 1 and 2 discloses a device 1 which is adapted for monitoring a selectable area 2 in order to detect if an undesired object 3 is present within the area. The device 1 includes a support element 5 and a carrying element 6. The support element 5 is intended to be located or mounted at an end or at the side of the area 2 to be monitored. The support element 5 may then include attachment members 7 of any suitable kind for attachment of the support element 5 on a substrate. In the embodiment disclose, the support element 5 is designed as a horizontal plate to be applied to a horizontal substrate, for instance the ground. The support element 5 may however also be designed in such a way that the device may be attached for instance to a vertical wall. The carrying element 6 is provided on the support element 5 in such a way that the carrying element 6 is rotatable reciprocally in relation to the support element. In the embodiment disclosed, this reciprocating rotation is provided by means of a motor 8. The device may also be designed as a mobile unit, wherein the support element 5 is designed to be locatable at a suitable location in the proximity of the area 2 to be monitored.

The device 1 also includes a laser 10, which is adapted to emit a laser beam B of a determined wavelength over the area 2, a photo sensor 11, which is arranged to receive a reflected part of the laser beam B and to generate a signal depending on the reflected part of the laser beam B. The laser 10 and the photo sensor 11 are both fixedly mounted to the carrying element 6 and directed in the same direction. Since the carrying element 6 is rotated in relation to the support element 5, both the laser 10 and the photo sensor 11 may thus be rotated in such a way that the laser beam B scans reciprocally over the area 2, wherein the scanned area 2 is sector-shaped.

The device 1 may also include a sight laser 12, which is used at the installation of the device 1 for calibrating the scan sector and which is also fixedly mounted to the carrying element 6 and directed in the same direction as the laser 10 and the photo sensor 11.

The laser 10 may be a diode laser operating with an intermittent operation, a so called pulsed laser, with a pulse frequency of for instance about 7 kHz. The laser 10 is adapted to emit laser light in the form of a laser beam B consisting of successive laser pulses, a so called pulse train. Each laser pulse may have a time length of 2-10 ns, for instance 4-5 ns. The time between each laser pulse is substantially longer than the pulse length and with the frequency mentioned above may thus be in the order of 140 µs, The laser light has a wavelength which may be longer than or equal to 1200 nm, preferably longer than or equal to 1300 nm, more preferably longer than or equal to 1400 nm and most preferably longer than or equal to 1500 nm. Especially, the wavelength may be about 1535 nm. Since the laser light with a wavelength over 1200 nm is not visible to the eye, the sight laser 12 mentioned above is required for the installation of the device. The sight laser 12 thus operates with a wavelength which is shorter than 12 nm. The laser 10 has a high effect since the pulse length is short in relation to the time between the pulses.

The laser beam B may thus scan over the area 2 by the carrying element 6 being rotated by the motor 8 in relation to the support element, where in the carrying element 6 and the laser 10 perform a reciprocating movement. The motor 8 may then be adjusted to such a scan speed that said scan in one direction lasts for a time shorter than 3 seconds, preferably shorter than 2 seconds and more preferably shorter than 1 second.

The possible area 2 or the scan sector is thus delimited by the range of the laser 10 and the photo sensor 11 and by the angle distance α between the end lines 13', 13" of the reciprocating laser beam B. The device 1 is thus advantageously designed in such a way that the laser beam B may scan over substantially the whole area 2 during on scan in one direction. The laser 10 and the photo sensor have a long range, which means that the area 2 has an extension extending at least 50 meters, especially 60, 70, 80, 90, 100, 125, 150 meters or more from the laser 10. The forward and rearward limitation 14', 14" of the area 2 are determined by the time during which the detection takes place, which is to be explained more closely below.

Furthermore, the device 1 includes an angle sensor 15, 16 which provides the angle β of the laser beam B in relation to one of the end lines 13'. The angle sensor 15, 16 may for instance include a semicircular-shaped cam element 15 mounted to one of the support element 5 and the carrying element 6, and a sensor 16 which may be inductive, capacitive or of any other kind and which is mounted to the opposite element 5, 6. By sensing the distance from the sensor 16 to the cam element 15 the actual angle β may be determined with a great accuracy. The angle sensor 15, 16 may also be realised in various other ways, for instance by means of a potentiometer.

The device 1 also includes an evaluation unit 20, which is arranged to process the generated signal in order to determine if an undesired object is present within the area 2. The evaluation unit 20 may include a processor 21, a memory unit 22, a time measuring unit 23 and a screen 24 or the like.

The evaluation unit 20 is by means of the processor 21 arranged to compare the generated signal with a reference signal and to establish that an object is present within the area 2 if the generated signal deviates from the reference signal with a minimum predetermined value.

The reference signal, stored in the memory unit 22, may be an energy profile, i.e. a curve corresponding to one scan over the area 2 at a normal state, i.e. when no undesired object is present within the area 2. The generated signal may also be an energy profile, i.e. a curve corresponding to a new or the latest scan over the area 2. If no object is present within the area 2 at this new scan, the curve for the generated signal will be substantially identical to the curve for the reference signal. A comparison of the two signals can be made by means of a subtraction of the two curves from each other. Such a comparison between the two signals may be made in a very quick manner and with use of a relatively small computer power. In order to reduce errors from the correlation between the angle sensors 15, 16 and the reflected laser beam, the comparing scans may be made between two scans in the same direction, i.e. between two scans beginning at the same end line 13', 13". If scan 1 is clockwise, scan 2 is counter-clockwise, scan 3 clockwise and thus scan 1 and scan 3 can be compared to each other and scan 2 and scan 4 to each other.

Figure 3:
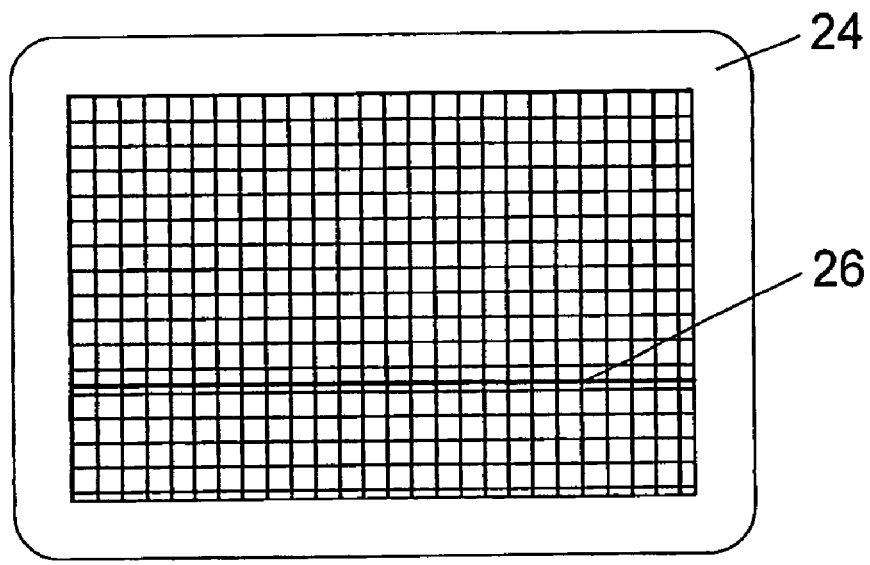
FIG. 3 discloses schematically a screen of the device in FIG. 1 at a normal state.
Figure 4:
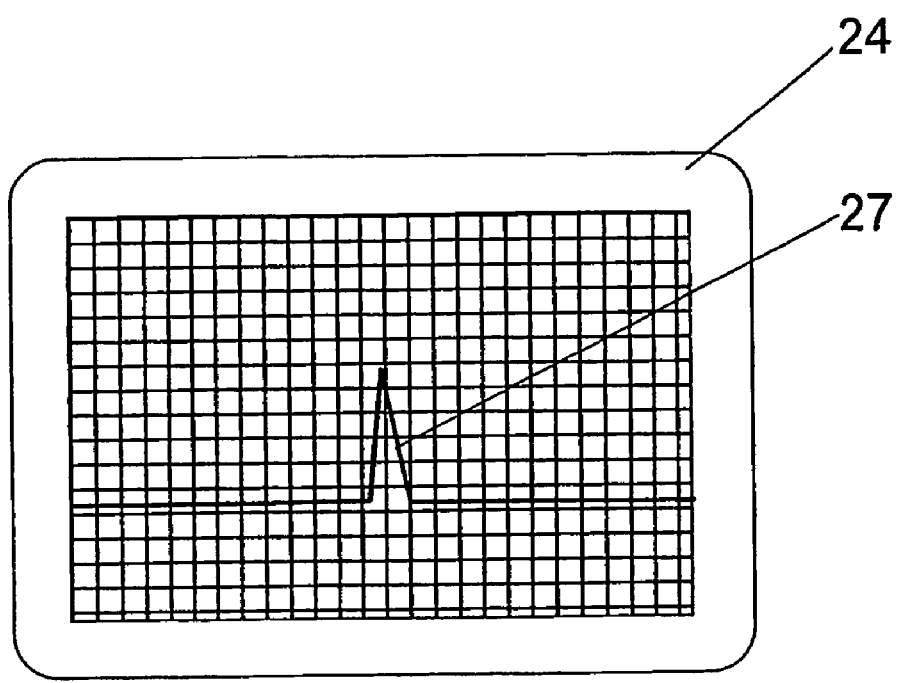
FIG. 4 discloses schematically a screen of the device in FIG. 1 at a particular state.

If no object is present within the area 2, i.e. if the normal state prevails, the result of this subtraction can be represented by a straight line 26, which runs in parallel with a time axis and which for instance can be shown on the screen 24, se FIG. 3, or any other remotely located screen. If however an undesired object has arrived at the area 2, i.e. if a particular state arises, the curve of the generated signal may deviate from a curve of the reference signal. The result of the subtraction will then give a deviating value at the object. This deviating value can be shown on the screen 24, se FIG. 4, or any other remotely located screen, as a deviation 27 from the straight line. Such a deviation 27 may easily be read manually by a person being responsible for the monitoring of the track area.

It is also possible to let the processor 21 sense this deviation and to provide an automatic reading, for instance by letting the processor 21 generate a warning signal which may initiate an alarm device 28 or, for instance, connecting of an monitoring camera (not disclosed) where the deviation arises, i.e. at the position where the undesired object is present. The sensitivity of the device 1 or the limit value for alarming may vary as a function of the distance from the laser 10 to the point where the laser beam B is reflected at the normal state. This sensitivity may be adjusted at the installation of the device, wherein a specific sensitivity is defined by each individual angle β. Such a varying sensitivity over the area 2 or the scan sector improves the dynamics of the system and reduces the risk of false alarm at strong reflected signals at short distances.

The memory unit 22 which stores the reference signal may be continuously updated by a new reference signal. For instance, the latest generated signal may form the basis for an updating of the reference signal by letting the latest generated signal continuously form a new reference signal. Of course it is also possible not to use each new generated signal for an updating of the reference signal, but for instance every second, every third, every forth etc. generated signal. In such a way a new reference signal, which is stored in the memory unit 22 may be created at each new scan provided that the curve of latest generated signal substantially, but not necessarily completely, corresponds to the curve of the reference signal. By means of such a continuous updating it is possible to let the device be self adapted to changed light conditions, slow permitted changes within the area etc. By means of a variable mean value formation, that the speed of the device 1 with respect to changes in the deviation from the normal state may be further improved. The mean value of the generated signal at each individual angle β may be calculated by a predetermined number of measured values from the latest preceding scans. Such mean values may include measured values of the generated signal from 1, 2, 3, 4, 5 or more preceding scans. In such a way the capability of the device to adapt to changed conditions is further improved.

The evaluation unit 20 is arranged to measure the reflected part of the laser pulse B during an adjustable time period after the laser pulse B has been emitted from the laser 10. The time measuring unit 23 senses when the laser pulse B is emitted. The evaluation unit 20 is arranged to initiate measurement of the reflected part an adjustable first time after the laser pulse B has been emitted and to terminate the measurement of the reflected part an adjustable second time after the laser pulse has been emitted. The time period mentioned above corresponds to the difference between the second time and the first time.

The time measuring unit 24 may also be arranged to register a first point of time when a laser pulse B is emitted, compare above, and a second point of time when the reflected part is received. The evaluation unit 20 may then calculate the distance to an undesired object by means of the difference between the second point of time and the first point of time. Furthermore, the evaluation unit 20 may calculate the size of an undesired object by means of the difference between the above mentioned angles and by means of the difference between the second point of time and the first point of time.

Figure 5:
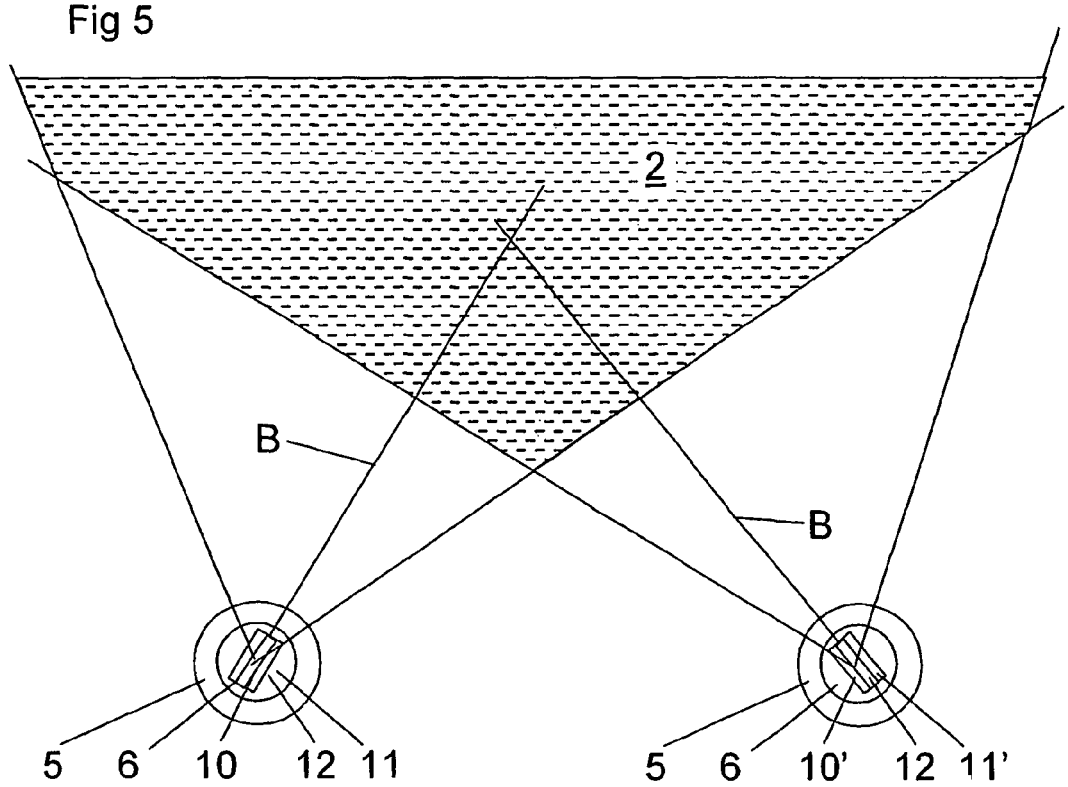
FIG. 5 discloses schematically a view from above of a device according to another embodiment.

FIG. 5 discloses a second embodiment of the device, which, in addition to a first laser 10 and a first photo sensor 11, also includes a second laser 10', which is connected to the evaluation unit 20 and adapted to emit a second laser pulse B of a determined wavelength over the area 2, and a second photo sensor 11', which is connected to the evaluation unit 20 and arranged to receive a reflected part of the second laser pulse B. The evaluation unit 20 is also arranged to measure the reflected part of the second laser pulse B during a predetermined time period after the laser pulse has been emitted from the second laser 10', to generate a second signal depending on the measured reflected part and to process the generated signal in order to determine if an undesired object is present within the area 2. According to the second embodiment, the first laser 10 and the first photo sensor 11 are located at a predetermined distance from the second laser 10' and the second photo sensor 11', wherein the evaluation unit 20 may estimate the size of an undesired object by comparing first signal and the second signal. Preferably, the second laser 10' and the second photo sensor 11' are of the same kind as the first laser 10 and the first photo sensor 11.

Figure 6:
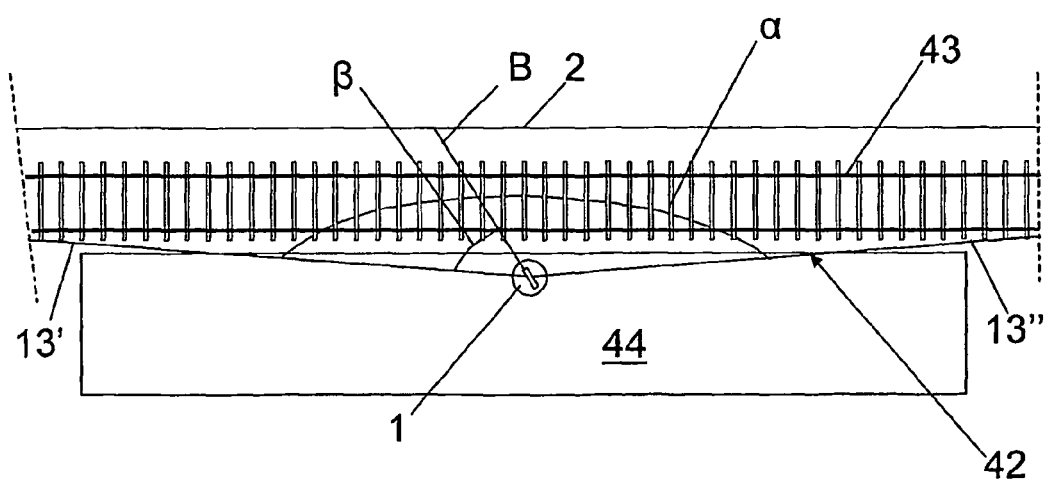
FIG. 6 discloses schematically a view from above of a device according to the invention at an area of an underground station.

According to an embodiment disclosed in FIG. 6 the area 2 includes a track area 42 at an underground station or a railway station. In this application, the device 1 may be located beside the track 43 and beneath the platform 44. Preferably, the device 1 is located under the platform 44 where it may be protected from damages, and the laser beam B may scan freely without being disturbed by the normal activity at the underground station. According to a specific embodiment, the invention is constituted by a monitoring system including a track area 42 at an underground track 43 or another railway track 43 and a device according to the description above for monitoring the track area 42.

Figure 7:
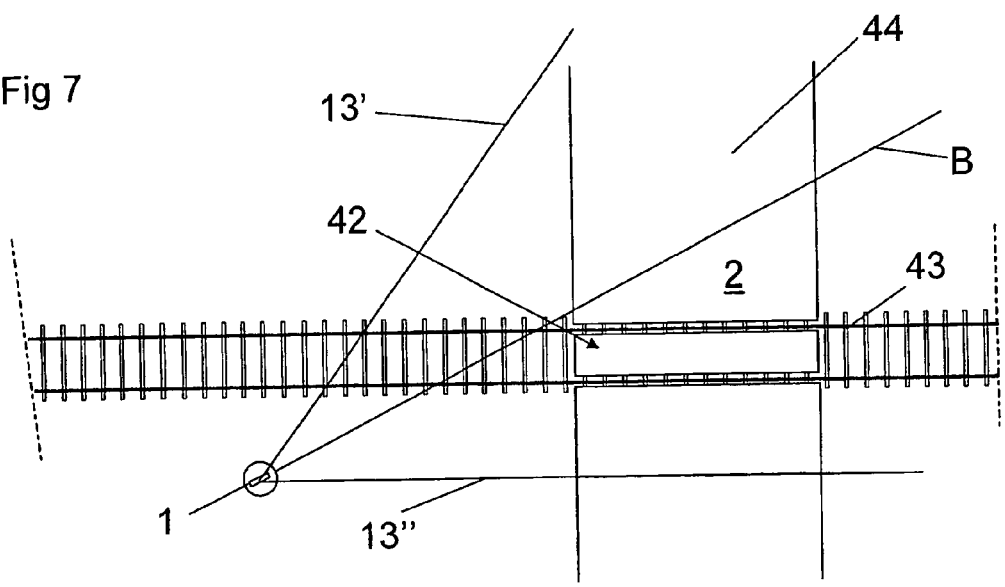
FIG. 7 discloses schematically a view from above of a device according to the invention at an area at a railroad crossing.

According to a further embodiment, disclosed in FIG. 7, the area 2 includes a track area 42 at a railway track 43, for instance at a railway crossing, i.e. the railway track 43 is crossed by a road 44.

Figure 8:
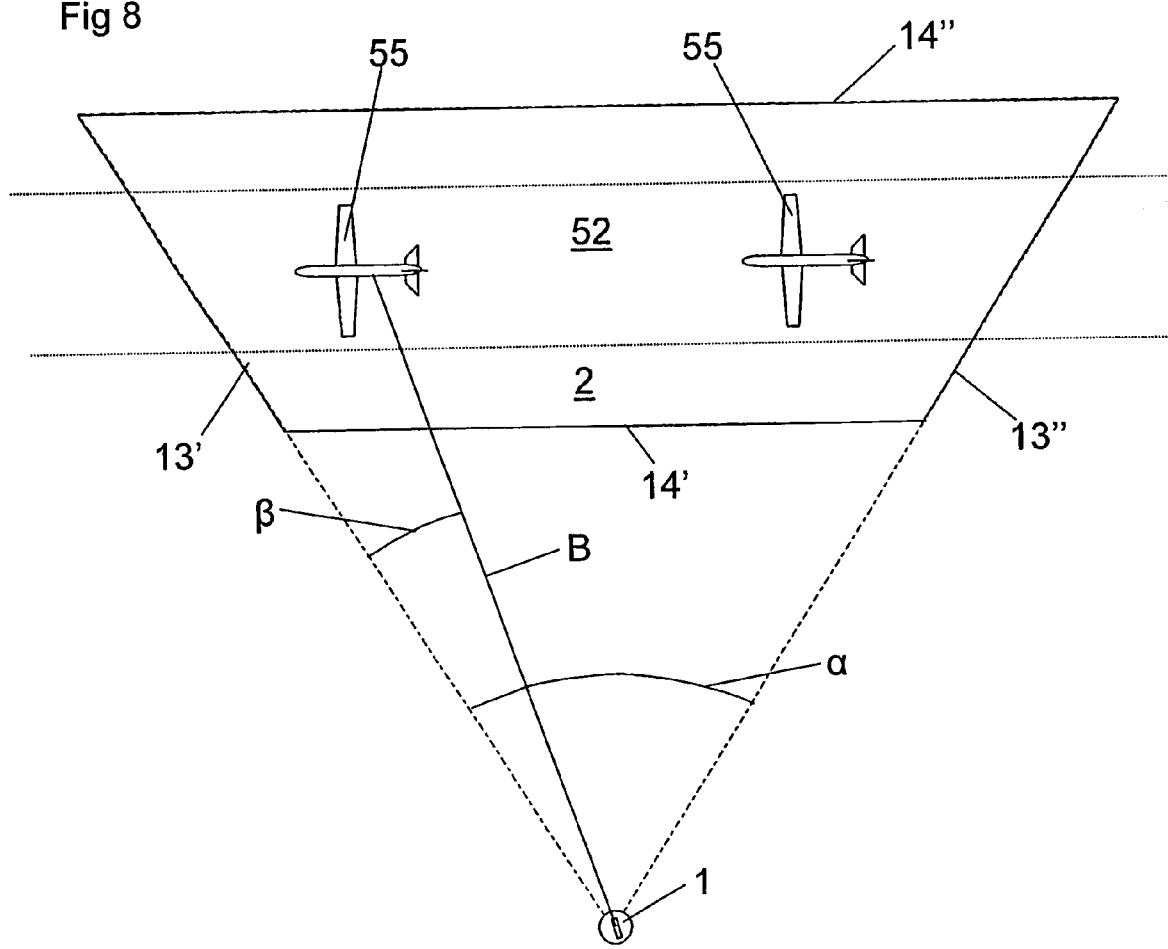
FIG. 8 discloses schematically a view from above of a device according to the invention at an area of an airport.

According to a further embodiment, disclosed in FIG. 8, the area 2 includes an airport area 52 at an airport. The airport area 52 may for instance be a parking place for aircraft 55, a runway or any similar area where the aircraft 55 is present. By means of the device 1, the actual airport area 52 may be monitored in an efficient manner and a warning may be generated if an intruder, which is not permitted to be present within the area, or any other undesired object arrives at the airport area 52 where an aircraft 55 is to pass. Such an object may be another aircraft 55, any other airport vehicle, etc.

The invention is not limited to the embodiments disclosed but may be varied and modified within the scope of the following claims. In the figures attached, a device for scanning in a substantially horizontal plane is disclosed. Depending on how the device is positioned, it may however be used for scanning in an arbitrary plane, for instance a substantially vertical plane. The device may also include means for providing a movement, for instance a reciprocating movement, of the carrying element 6 in relation to the support element 5 in the space, i.e. the carrying element 6 is moving both in a horizontal direction and a vertical direction in relation to the support element 5. Of course such a scanning in the space, as well as a scanning in substantially one plane, may also be obtained by means of optics instead of by means of the mechanical arrangement disclosed.

What is claimed is:

1. A device adapted for monitoring a delimited area in order to detect if an undesired object is present within the area, comprising:
   at least a first laser, which is adapted to emit a laser pulse of a determined wavelength over the area,
   at least a first photo sensor, which is arranged to receive a reflected part of the laser pulse,
   an evaluation unit, which is connected to the laser and the photo sensor,
   wherein the evaluation unit is arranged to measure the reflected part of the laser pulse during an adjustable time period after the pulse has been emitted from the laser, to generate a signal having an energy and depending on the measured reflected part, and to process the generated signal in order to determine if an undesired object is present within the area, and
   wherein the evaluation unit is arranged to compare the generated signal with a reference signal having an energy, and to establish that an object is present within the area if the energy of the generated signal exhibits a deviation from the energy of the reference signal with a minimum predetermined value.

2. A device according to claim 1, wherein the evaluation unit is arranged to initiate said measuring of the reflected part includes measuring at an adjustable first time after the laser pulse has been emitted and to terminate said measuring at an adjustable second time after the laser pulse has been emitted, wherein said adjustable time period corresponds to the difference between the second time and the first time.

3. A device according to any one of claim 1, wherein said laser is adapted to emit a laser beam (B) formed by successive laser pulses.

4. A device according to claim 3, wherein the device is arranged to scan the laser beam over the area in such a way that substantially the whole area is subjected to the laser beam during one scan.

5. A device according to claim 4, wherein the device is arranged to scan the laser beam over the area with a reciprocating movement in a such a way that the scanned area has a sector-like shape with two limiting end lines forming an angle ($\alpha$) between each other.

6. A device according to claim 1, wherein said laser is arranged to emit laser light with a wavelength which is longer than or equal to 1200 nm.

7. A device according to claim 1, wherein the device includes an angle sensor sensing an angle ($\beta$) between an instantaneous laser pulse and a reference line.

8. A device according to claim 5, wherein the reference line is formed by one of the end lines.

9. A device according to claim 7, wherein the evaluation unit is arranged to register, by means of said angle sensor, a first angle as soon as the generated signal exhibits said deviation and a second angle as soon as the generated signal no longer exhibits said deviation.

10. A device according to claim 9, wherein the evaluation unit is arranged to estimate the size of an undesired object by means of the difference between said angles.

11. A device according to claim 1, wherein the device includes a memory unit arranged to store the generated signal.

12. A device according to claim 9, wherein the evaluation unit is arranged to update the reference signal by means of the generated signal.

13. A device according to claim 1, wherein the evaluation unit is arranged to generate a warning signal if it establishes that an object is present within the area.

14. A device according to claim 1, wherein the evaluation unit includes a time measuring unit arranged to register a first point of time when a laser pulse is emitted and second point of time when the reflected part is received.

15. A device according to claim 14, wherein the evaluation unit is arranged to calculate the distance to an undesired object by means of the difference between the second point of time and the first point of time.

16. A device according to claim 10, wherein the evaluation unit is arranged to calculate the size of an undesired object by means of the difference between said angles and by means of the difference between the second point of time and the first point of time.

17. A device according to claim 15, wherein the evaluation unit is arranged to calculate the size of an undesired object by means of the difference between said angles and by means of the difference between the second point of time and the first point of time.

18. A device according to claim 1, wherein device includes:
    at least a second laser, which is connected to the evaluation unit and adapted to emit a laser pulse (B) of a determined wavelength over the area, at least a second photo sensor, which is connected to the evaluation unit and arranged to receive a reflected part of the laser pulse (B), and wherein the evaluation unit is arranged to measure the reflected part of the laser pulse (B) during an adjustable time period after the laser pulse has been emitted from the second laser, to generate a second signal depending on the measured reflected part and to process the generated signal in order to determine if an undesired object is present within the area.

19. A device according to claim 18, wherein the first laser and first photo sensor are located at a predetermined distance from the second laser and second photo sensor.

20. A device according to claim 18, wherein the evaluation unit is arranged to estimate the size of an undesired object by comparing the first signal and the second signal.

21. A device according to claim 1, wherein the area includes an area at a railway.

22. Use of a device according to claim 1, for monitoring said area.

23. Use according to claim 22, wherein the area includes an area at a railroad.

24. A device according to claim 22, wherein the area includes an area at an airport.

25. Use according to claim 22, wherein area includes an area at a ship port.

26. A method for monitoring a delimited area in order to detect if an undesired object is present within the area, wherein the method includes the steps of:

emitting a laser pulse of a determined wavelength over the area, receiving a reflected part of the laser pulse, measuring the reflected part of the laser pulse during a predetermined time after the laser pulse has been emitted, generating a signal having an energy and depending on the measured reflected part, processing the generated signal in order to determine if an undesired object is present within the area, comparing the generated signal with a reference signal having an energy, and establishing that an object is present within the area if the energy of the generated signal exhibits a deviation from the energy of the reference signal with a minimum predetermined value.

* * * * *